M. J. HOSCH.
HOG TROUGH.
APPLICATION FILED AUG. 1, 1917.
1,251,374.
Patented Dec. 25, 1917.
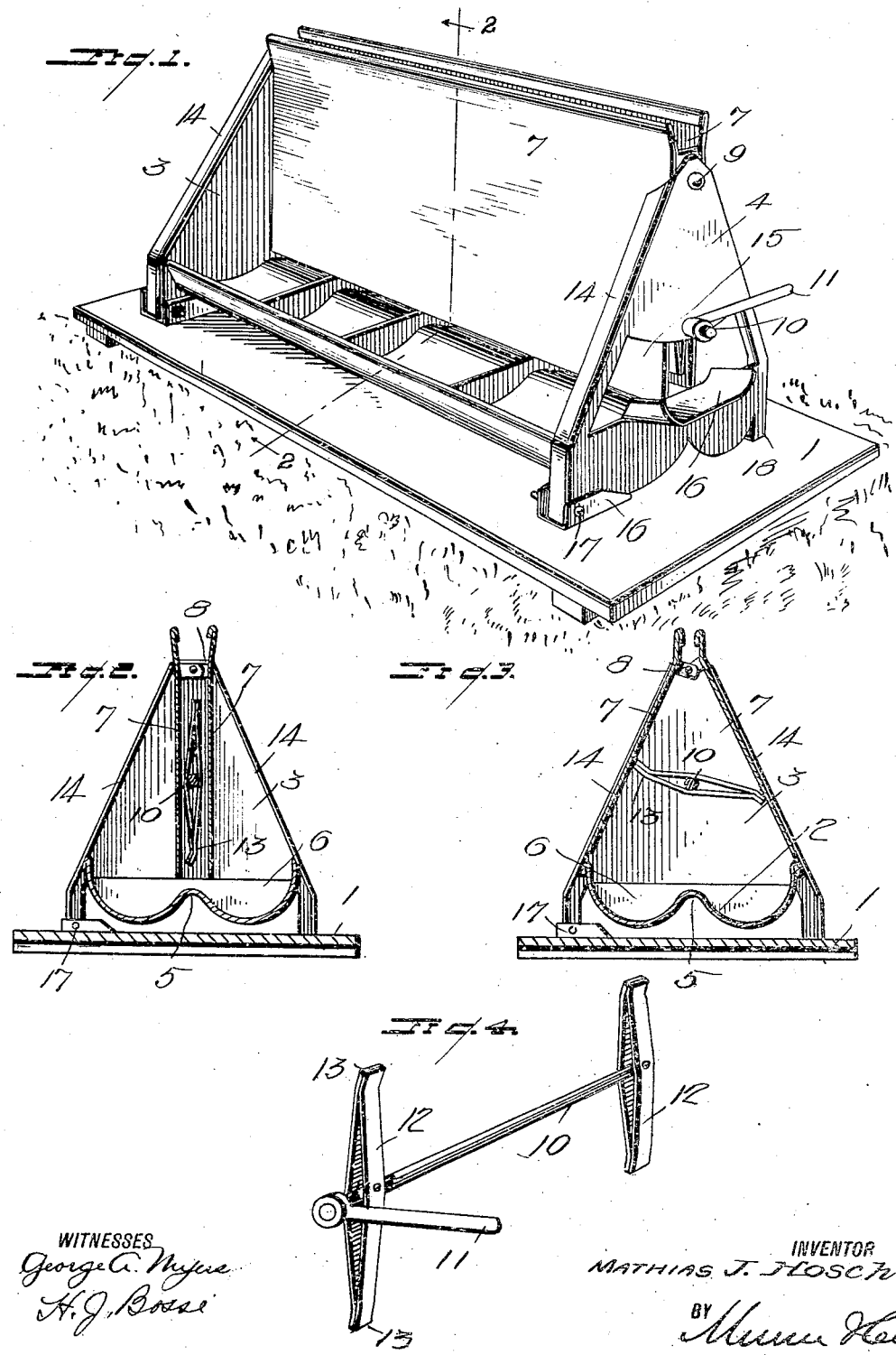

UNITED STATES PATENT OFFICE.

MATHIAS J. HOSCH, OF RANDOLPH, NEBRASKA.

HOG-TROUGH.

1,251,374.  Specification of Letters Patent.  Patented Dec. 25, 1917.

Application filed August 1, 1917. Serial No. 183,889.

*To all whom it may concern:*

Be it known that I, MATHIAS J. HOSCH, a citizen of the United States, and a resident of Randolph, in the county of Cedar and State of Nebraska, have invented new and useful Improvements in Hog-Troughs, of which the following is a specification.

My invention is an improvement in hog troughs, and has for its object to provide a trough of the character specified, wherein the ends of the trough are extended and plates are pivoted between the said ends to normally hang in vertical position at the center of the trough, other mechanism being provided for swinging the lower ends of the plates outwardly in line with the edges of the trough to close the trough during the insertion of feed, one end of the trough having a feed opening and the operating means for the plates being arranged at the said end.

In the drawings:

Figure 1 is a perspective view of the trough;

Fig 2 is a section on the line 2—2 of Fig. 1, looking in the direction of the arrows adjacent the line, and with the trough in feeding position;

Fig 3 is a similar view with the trough closed;

Fig. 4 is a perspective view of the operating mechanism for the leaves or plates.

In the present embodiment of the invention, the trough is arranged on a suitable platform 1 and the trough proper, which consists of a body 2 and ends 3 and 4, is preferably of metal, as shown, and is divided by an upwardly offset rib or bead 5 into two portions, each of which has a rounding bottom, as shown.

Partition plates 6 are arranged transversely of the trough, the said plates extending through both portions of the trough as shown. Plates or leaves 7 are pivoted between the ends 3 and 4 at the tops of the said ends, the said plates having inwardly extending lugs 8 near their upper edges, which are pivoted to the ends 3 and 4, as indicated at 9. The plates normally hang in the position of Figs. 1 and 2, being so arranged that they will normally rest at about the center of the trough and above the rib 5 which separates the trough into two portions. In this position they offer no impediment to the feeding of the hogs, since the hogs have free access to either portion of the trough.

A shaft 10 is journaled longitudinally of the trough in the ends and intermediate the pivotal connection of the plates and the bottom of the trough and between the plates 7, and the said shaft has at the end 4 a handle 11 for permitting the shaft to be oscillated. Cross heads 12 are arranged at the ends of the shaft inside the ends 3 and 4, and the said cross heads are adapted to engage the leaves or plates to spread them apart, as shown in Fig. 3, to close the trough.

Each of these cross heads, as shown in Fig. 4, is formed from two strips abutting at their ends and arranged on opposite sides of the shaft at their center. The superposed ends of the strips are bent in opposite directions, as indicated at 13, and it will be obvious that when the shaft is oscillated to cause the bent ends 13 of the cross heads to engage the plates 7, the said plates will be spread apart at their lower edges into the position of Fig. 3, the cross heads being just long enough to spread the plates into such position.

The outward swinging movement of the plates is limited by inwardly extending flanges 14 on the ends, and it will be noticed that the said ends taper toward their tops. The upper end of each plate or leaf 7 is bent outwardly, as shown in Figs. 2 and 3, so that the said edges do not interfere with the swinging of the plates.

The end 4 has a feed opening 15 for permitting feed to be inserted in the trough, and a species of guard or deflector 16 is arranged at the feed opening for supporting a bucket and for guiding the material into the trough.

In use, when it is desired to feed the hogs, the parts are arranged as shown in Fig. 3, the shaft 10 being oscillated to cause the cross heads to open the leaves to engage the flanges 14. The hogs are barred from the trough, and the feed may be inserted without interference from the hogs. After the feed has been inserted the shaft is turned to permit the plates or leaves to swing back into the position of Fig. 2.

Preferably, the trough is hinged to the platform at one edge to permit it to be swung with the bottom in approximately vertical position for cleaning purposes. As shown, channel plates 16 are secured to the platform at one side of the trough, and the ends at the said side fit into the channel plates and are pivoted thereto, as indicated at 17. At the opposite side the trough has feet 18 which rest upon the platform. To clean the trough it is only necessary to tip the trough over

I claim:

1. A hog trough having its ends extended upwardly, the side edges of the ends converging toward their tops and the said side edges having inwardly extending flanges, one end having a feed opening for the trough, plates pivoted between the ends near the upper edges of the plates to normally hang at the center of the trough, and means for swinging the plates outwardly at their lower edges, the flanges engaging the edges to limit the outward swinging of the plates to a position with their lower edges in register with the trough edges 2. A hog trough having its ends extended upwardly, plates pivoted between the ends near the upper edges of the plates to normally hang at the center of the trough near each other, and means for swinging the plates outwardly at their lower edges, said means comprising a shaft journaled between the plates and having cross heads for engaging the plates.

3. A hog trough having a central longitudinal rib dividing the trough into two sections, the ends of the trough being extended upwardly, plates pivoted between the ends to normally hang at the rib and in such position as to form a division wall between the sections, and means for swinging the plates outwardly at their lower edges away from each other to prevent access to the sections of the trough.

MATHIAS J. HOSCH.

Witnesses:
C. BILLINEY,
E. A. HOFFMAN.

Copies of this patent may be obtained for five cents each, by addressing the "Commissioner of Patents, Washington, D. C."